United States Patent [19]

Martin

[11] Patent Number: 4,766,600
[45] Date of Patent: Aug. 23, 1988

[54] CHARACTERIZATION OF DIGITAL RADIO SIGNALS

[75] Inventor: Andrew L. Martin, Ferny Creek, Australia

[73] Assignee: Australian Telecommunications Commission, Melbourne, Australia

[21] Appl. No.: 829,150

[22] PCT Filed: May 15, 1985

[86] PCT No.: PCT/AU85/00107

§ 371 Date: Feb. 24, 1986

§ 102(e) Date: Feb. 24, 1986

[87] PCT Pub. No.: WO85/05518

PCT Pub. Date: Dec. 5, 1985

[30] Foreign Application Priority Data

May 15, 1984 [AU] Australia ............................. PG4999
Dec. 24, 1984 [AU] Australia ............................. PG8701

[51] Int. Cl.$^4$ ............................................. H04B 17/00
[52] U.S. Cl. ........................................ 375/10; 455/67; 364/550
[58] Field of Search ............... 375/10, 40, 99; 371/15, 371/22, 5; 370/13, 17; 455/62, 67, 226; 364/550, 551, 554, 514, 517; 324/77 A, 77 E, 77 F

[56] References Cited

U.S. PATENT DOCUMENTS

| | | | |
|---|---|---|---|
| 3,415,947 | 12/1968 | Abbey et al. ........................... | 455/67 |
| 3,487,312 | 12/1969 | Egan et al. ............................. | 455/62 |
| 4,166,980 | 9/1979 | Apostolos et al. .................... | 455/226 |
| 4,349,915 | 9/1982 | Costas ..................................... | 455/65 |
| 4,393,499 | 7/1983 | Evans ..................................... | 371/22 |
| 4,556,982 | 12/1985 | Dunn ...................................... | 375/10 |
| 4,633,411 | 12/1986 | Bliss et al. ............................. | 371/22 |

FOREIGN PATENT DOCUMENTS 1507079 4/1978 United Kingdom.
2105555 3/1983 United Kingdom.

OTHER PUBLICATIONS

M. Liniger, "Sweep Measurements of the Transferfunction of a RF-Channel and Their Representation by Polynomials", Conference Record, ICC '82, Jun. 1982.
M. Liniger, "One Year Results of Sweep Measurements of a Radio Link", Conference Record, ICC '83, Jun. 1983.
M. Liniger, "Sweep Measurements of Multipath Effects on Cross-Polarized RF-Channels Including Space Diversity", Conference Record, ICC '84, Jun. 1984.

Primary Examiner—Benedict V. Safourek

[57] ABSTRACT

A method of characterizing a modulated carrier signal by generating electrical signals which represent arithmetic ratios and which can be used to construct a histogram indicative of the quality of the modulated carrier signal. For a digitally modulated carrier signal, time spaced samples of in band amplitude dispersion of the signal are generated and first counts are made of the number of occurrences of particular values of in band dispersion, over a range of such values. The error ratio of the decoded modulated carrier signal is also monitored and seconds counts are accummulated, of the numbers of occurrences of respective values of in band amplitude dispersions which at least substantially coincide with the value of said error ratio crossing a predetermined level. The ratio of each second count to each corresponding first count is then taken and these ratios are then representative of the probability that, at the respective in band amplitude dispersion value, the value of the error ratio will cross the predetermined level. When practicing the method with analogue modulated carrier signals, values of the signal to noise ratio are employed instead of the values of error ratio. A method of the invention permits construction of a histogram which pictorially represents the quality of the modulated carrier signal.

32 Claims, 13 Drawing Sheets

FIG. 4
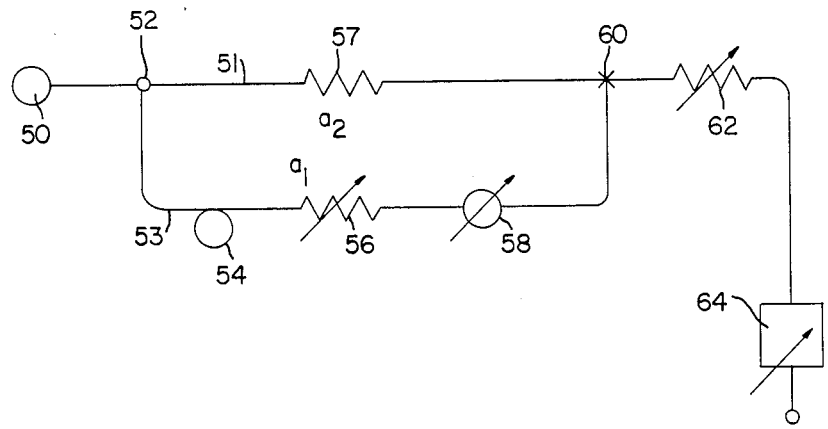
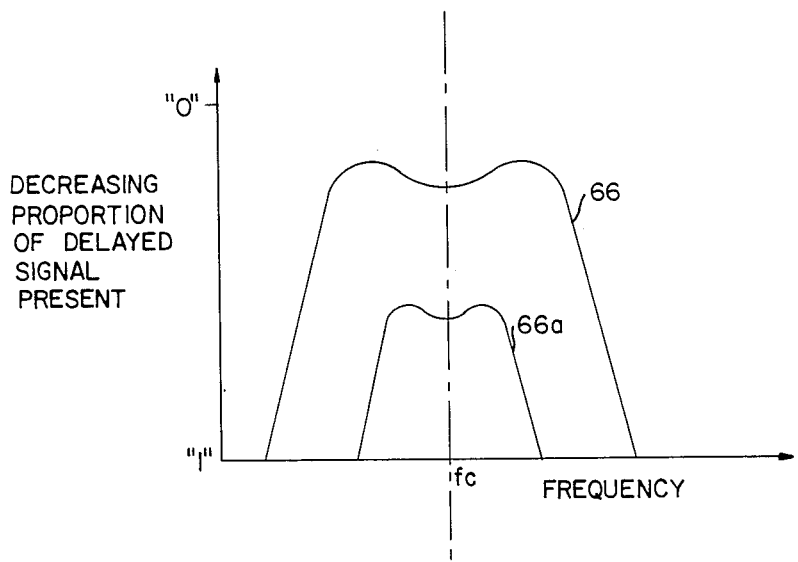
FIG. 5

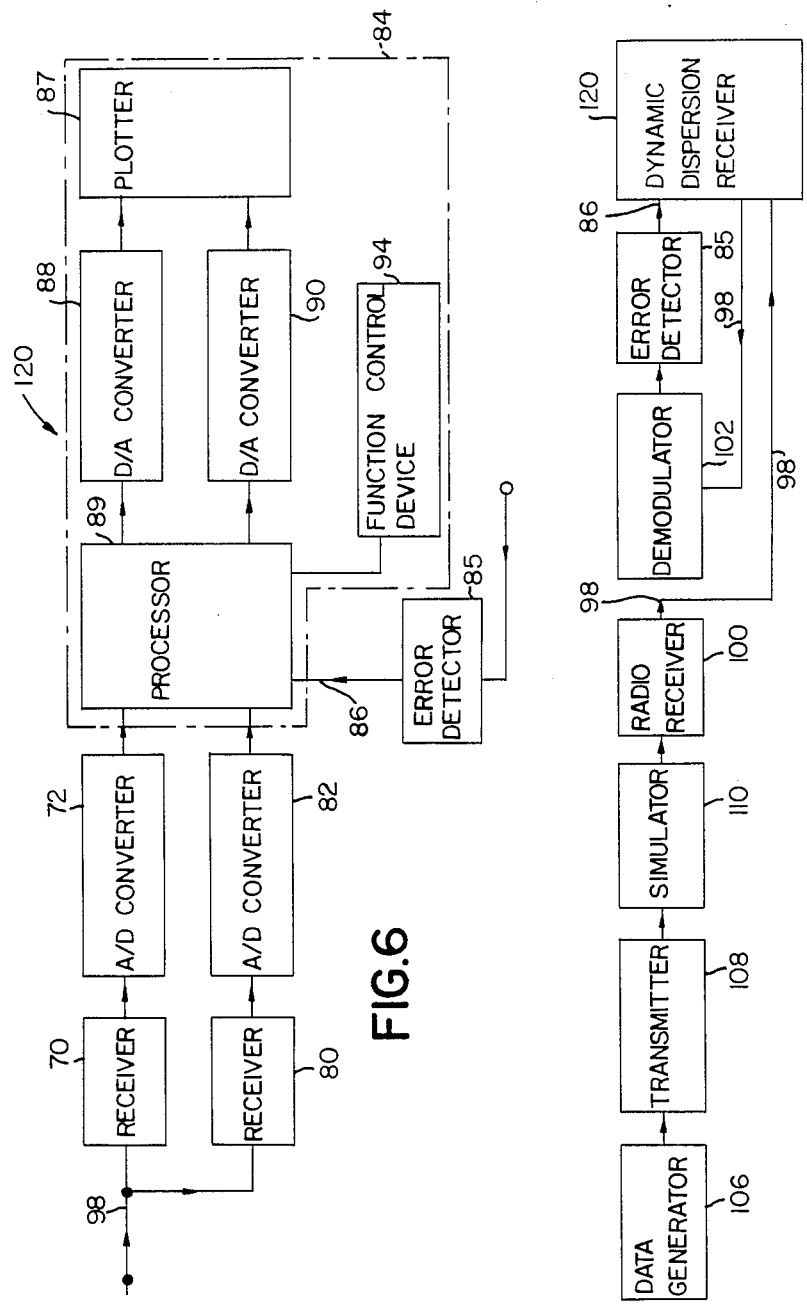

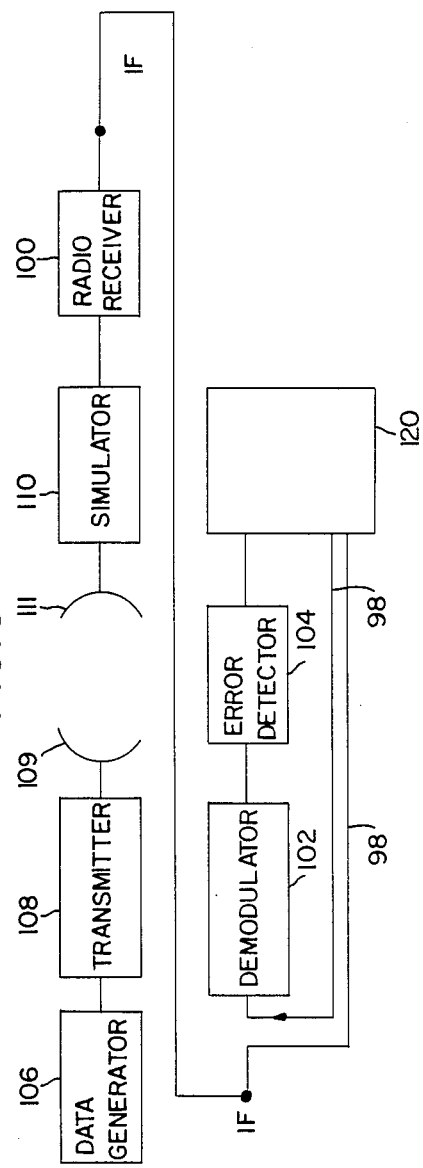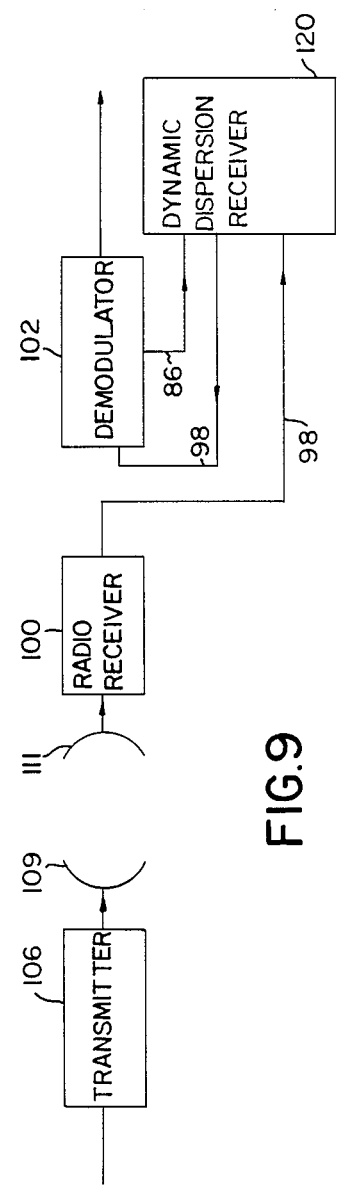
FIG.8
FIG.9

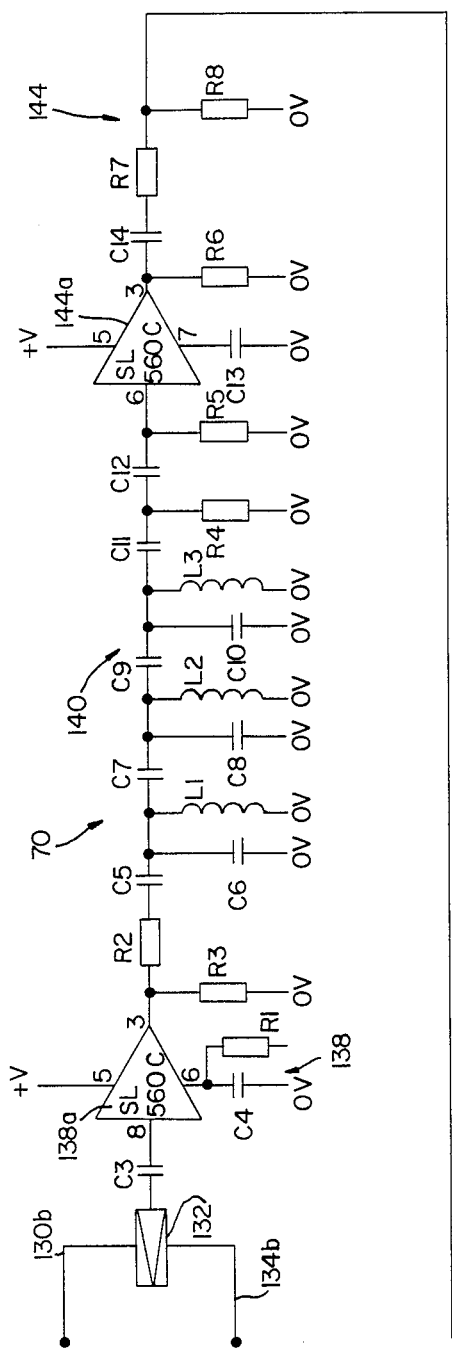
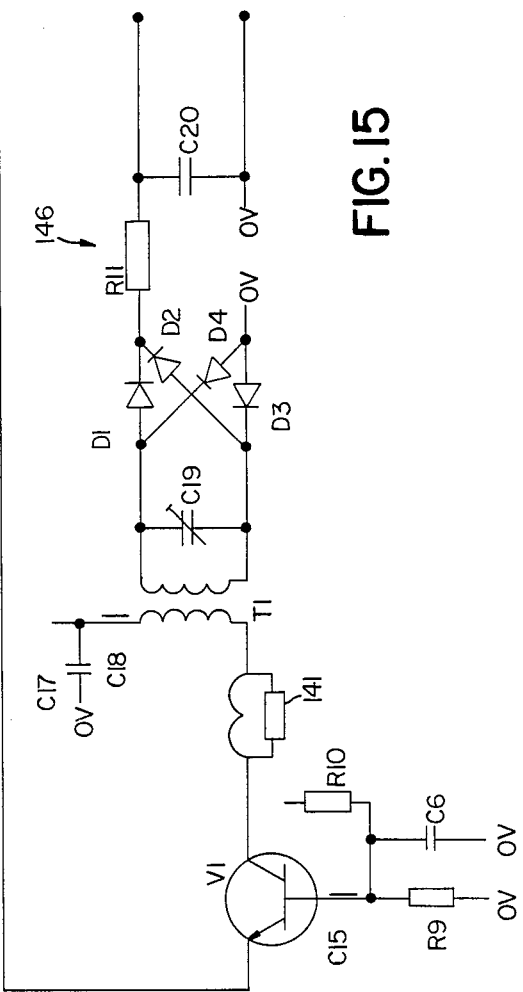
FIG.15

CHARACTERIZATION OF DIGITAL RADIO SIGNALS

This invention relates to characterisation of modulated electrical signals, particularly but not exclusively for the purposes of evaluation of performance of digital radio data signal systems or of components for use in such systems.

It is well known that radio signals generated as a modulated carrier may be received in down-graded form at the receiver of a transmission system for a variety of reasons. A particular form of signal degradation known as multipath interference occurs wherein differently directed components of the transmitted signal both reach the receiver after travelling along paths of different lengths. If the signal components arrive in-phase, constructive interference will arise, and if the signal components arrive out of phase, destructive interference will arise. For given signal paths for the two signal components, a multi-frequency signal such as the digitally modulated carrier mentioned will be affected differently at different frequencies. At some frequencies, constructive interference will occur whilst at others destructive interference will occur. In the former case an increase in signal strength will be apparent, and in the latter case, a decrease will be apparent. The resultant alternate nodes and antinodes in the plot of signal strength against signal frequency, at which constructive and destructive interference arise, may give rise to signal distortion which renders demodulation of the received signal difficult. This phenomenon arises because of existence of particular atmospheric conditions, and variation of these conditions may result in shifting of the transmitted signal nodes and antinodes back and forth along the bandwidth of the transmitted signal so that the signal, as received, is caused to vary in an unpredictable fashion, further increasing the difficulty of demodulating. Various strategies including use of various types of compensating circuitry are employed in receivers for the purpose of minimising errors in these circumstances.

In order to evaluate the performance of circuitry for reducing demodulation errors in, say, a receiver it is customary to apply to the receiver a simulated multipath interference signal. Circuitry is employed permitting generation, from a single input signal, of a pair of phase shifted component signals the relative magnitudes and phase shift and/or delay of which are variable. These component signals may be in the form of digitally modulated carriers and they are combined and fed to the receiver. The output of the receiver is monitored and the relative gains of the two component signals varied, for each of a number of phase shifts, so that various combinations of phase shift and relative gain are determined, for which combinations the error ratio in the demodulated signal just reaches some predetermined error ratio. From this data, a graph is plotted of relative signal proportion, as between the out of phase signals, against relative phase shift or against the frequency of an anti-node or "notch" in the frequency spectrum of the combined signal, since the phase shift is directly related to this notch frequency. This graph will be representative of the notch depth and notch position that will produce a particular bit error ratio in the output data signal.

A graph so obtained thus represents a characterisation of the combined test signals on the basis that notching at particular positions in the frequency bandwidth thereof will give rise to an error ratio equal to the predetermined ratio in the demodulated signal.

The preparation of these graphs is laborious, making testing slow. Furthermore, the resultant graph is obtained on the basis of static relationships between the component signals, whereon in a practical environment the relationship tends to change in a random fashion. Circuitry which performs well under static conditions in reducing demodulation errors may not be able to perform adequately under changing conditions so that the described method provides only an indirect guide to in-service performance.

An object of the invention is to provide an improved method of characterising electrical signals.

Thus, in one aspect, the invention provides a method of characterising a modulated carrier signal comprising:

(a) repetitively sampling at time spaced intervals the in band amplitude dispersion of the signal;

(b) accumulating first counts of numbers of occurrences of respective in band dispersion values over a range of said values;

(c) monitoring a paramater indicative of signal quality of a signal obtained by demodulating said modulated carrier signal;

(d) accumalating second counts of numbers of occurrences of respective in band amplitude dispersions of values within said range, and which last mentioned in band amplitude dispersions, at least substantially coincide with the value of said parameter crossing a predetermined level; and (e) dividing the second counts for each said in band amplitude dispersion value by the first count therefor, to obtain respective divided counts each representative of the probability that, at the respective in band amplitude dispersion value, the value of said parameter will cross said predetermined level.

Where the method is used for characterising a digitally modulated carrier signal, the monitored parameter may be the error ratio in the signal obtained by demodulating the digitally modulated carrier signal. Where the method is used for characterising an analogue modulated carrier signal the monitored parameter may be the signal-noise ratio of the signal obtained by demodulating the analogue modulated carrier signal.

The first counts are representative of a first histogram of frequency of occurrence of the various in band amplitude dispersion values, and the method may comprise generating this first histogram.

The second counts are representative of a second histogram of frequency of occurrence of the various in band amplitude dispersion values which coincide with occurrence of the aforementioned predetermined level being crossed. The method may comprise generating this second histogram.

The divided counts are representative of a third histogram of probabilities that, at various in band amplitude dispersion values, value of the measured parameter, such as the error ratio, will cross said predetermined level. The method may comprise generating this third histogram.

The method of the invention may be applied where said modulated signal is a directly received radio signal or it may be applied to signals derived therefrom such as the intermediate frequency signal in a superhetrodyne or like receiver.

The in band amplitude dispersion samples may be generated by a procedure of sampling, at substantially corresponding times, signal magnitudes at two different frequencies within the bandwidth of said modulated carrier signal, such as at frequencies spaced by equal frequency differences from the carrier frequency, and being located towards opposite ends of the usable bandwidths, and subtracting the sampled signal magnitudes in decibels at one said frequency from sampled signal magnitudes in decibels at said other frequency taken at corresponding times.

The dispersions may be assigned as negative or positive depending upon whether the magnitudes of sampled signals associated with a particular one of said two different frequencies are greater or less than the corresponding sampled signals associated with the other of said two frequencies. More complex methods of determining the in band amplitude dispersion, as practised in the art, may be employed, such as those involving alegraic combination of more than two samples at respective different frequencies.

The modulated carrier signal may be distorted by mixing of signal components of the same frequency where the phase and amplitude relationship between the components is continually varied, such as cyclically and substantially continuously.

The range of variations of phase and amplitude between the signal components is preferably selected so as to cause a notch in the frequency spectrum of the combined signal to move back and forth across the full bandwidth of that signal. In this case, the carrier signal may be randomly or pseudo randomly modulated, such as by phase and/or amplitude modulation.

The invention also provides apparatus for characterising a modulated carrier signal comprising:

(a) means for generating time spaced samples of in band amplitude dispersion of the signal;

(b) means for accumulating first counts of numbers of occurrences of respective in band dispersion values, over a range of said values;

(c) means for monitoring a parameter indicative of signal quality of a signal obtained by demodulating said modulated carrier signal;

(d) means for accumulating second counts of numbers of occurrences of respective in band amplitude dispersions of values within said range, and which last mentioned in band amplitude dispersions at least substantially coincide with the value of said parameter crossing a predetermined level; and (e) means for dividing the second counts for each said in band amplitude dispersion value by the first count therefor, to obtain respective divided counts each representative of the probability that, at the respective in band amplitude dispersion value, the value of said parameter will cross said predetermined level.

This means for generating samples of in band amplitude dispersion may comprise two receiver devices each in use receiving said modulated carrier signal and responsive to separate frequency signal components within the bandwidth of said modulated carrier signal, together with means for subtracting the output of one said receiver in decibels from the output of the other in decibels.

The invention may be practised by accumulating counts of numbers of occurrences of respective in band amplitude dispersions of values within said range, and which in band amplitude dispersions at least substantially coincide with said level crossing said predetermined level by exceeding that level. However, the invention may also be practised by accumulating counts of numbers of occurrences of respective in band amplitude dispersions of values within said range and which in band amplitude dispersions at least substantially coincide with said level falling below said predetermined level.

The invention is further described, by way of example only, with reference to the accompanying drawings, in which.

Figure 3A:
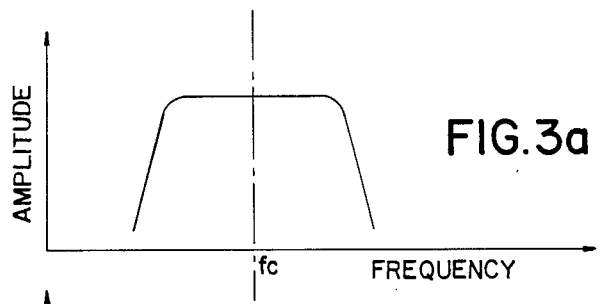
Figure 3B:
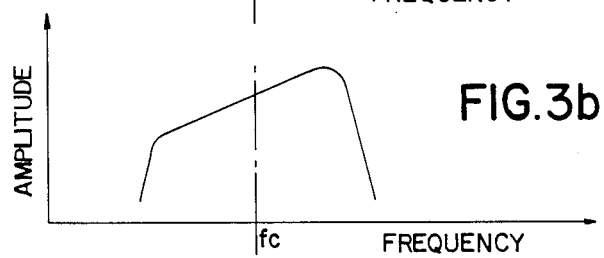
Figure 3C:
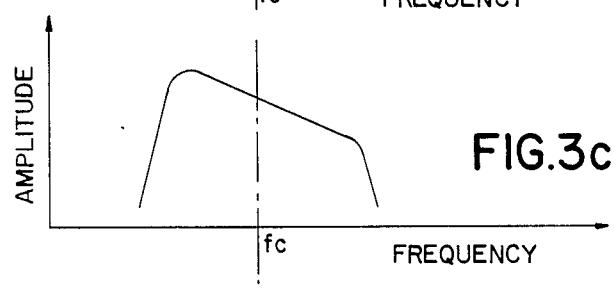
Figure 10:
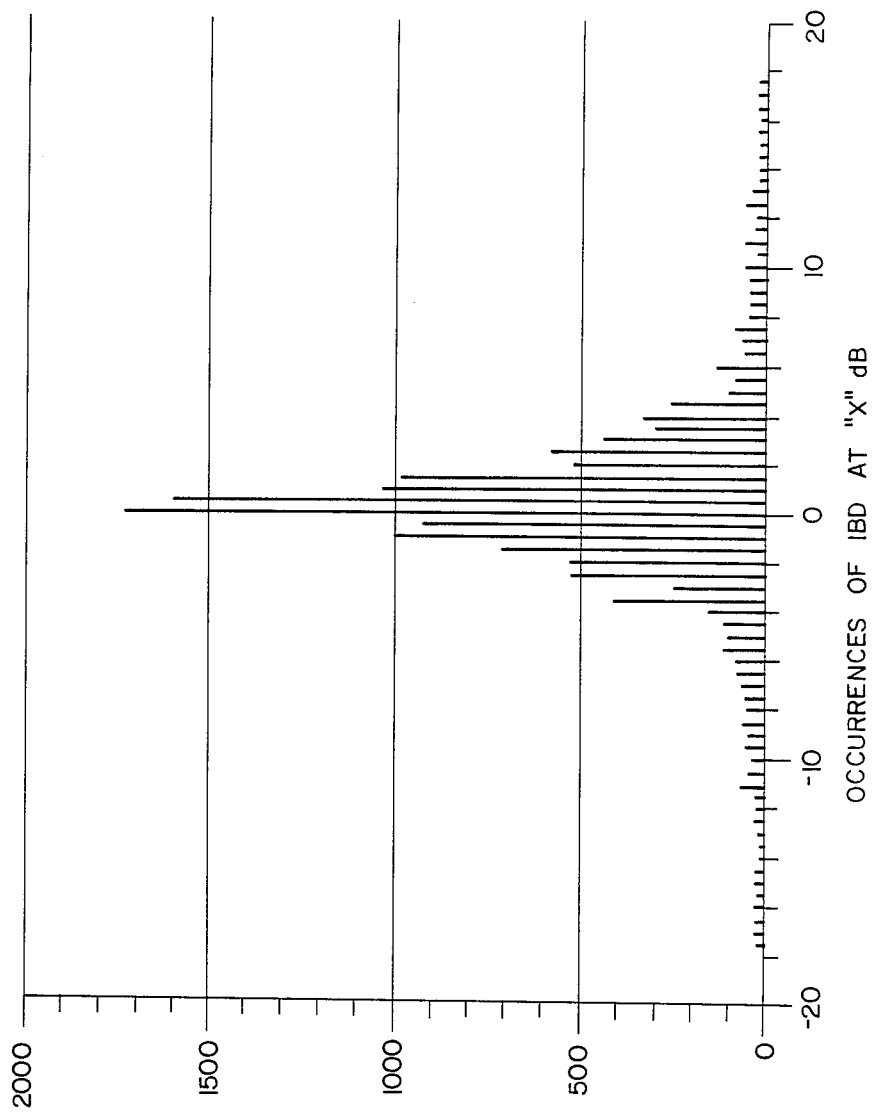
Figure 11:
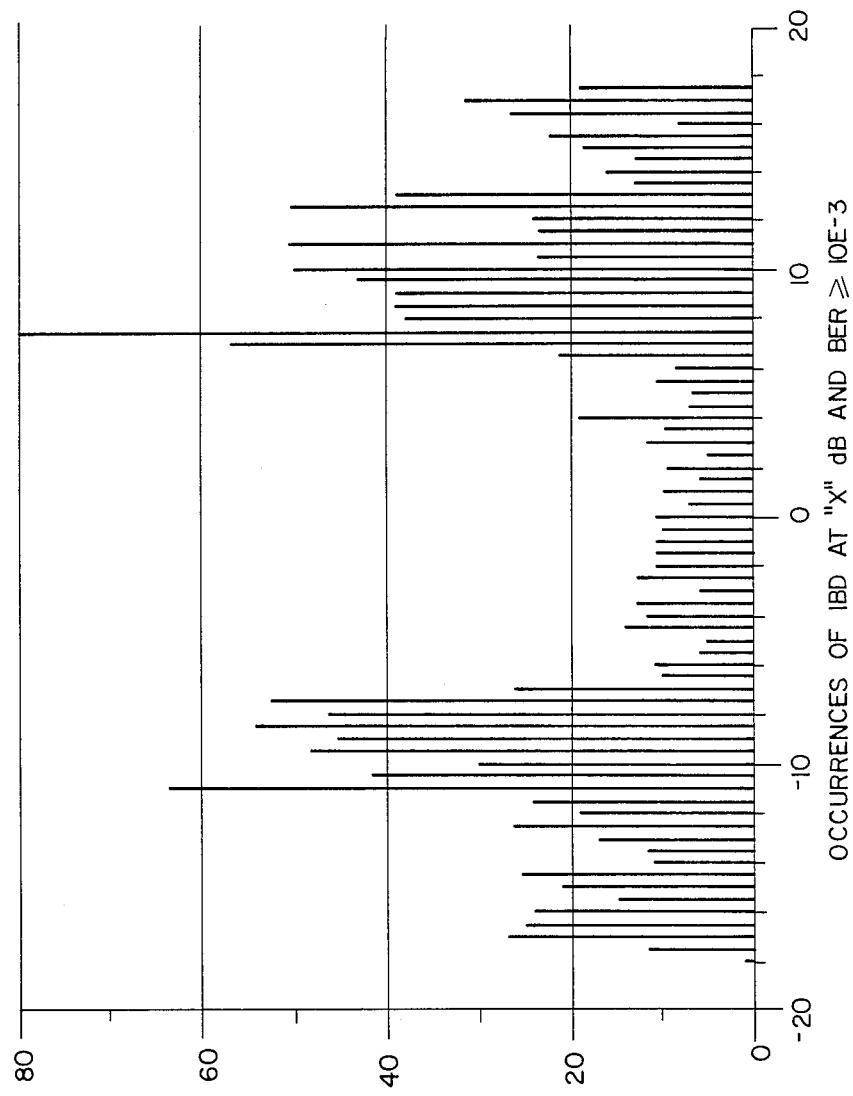
Figure 12:
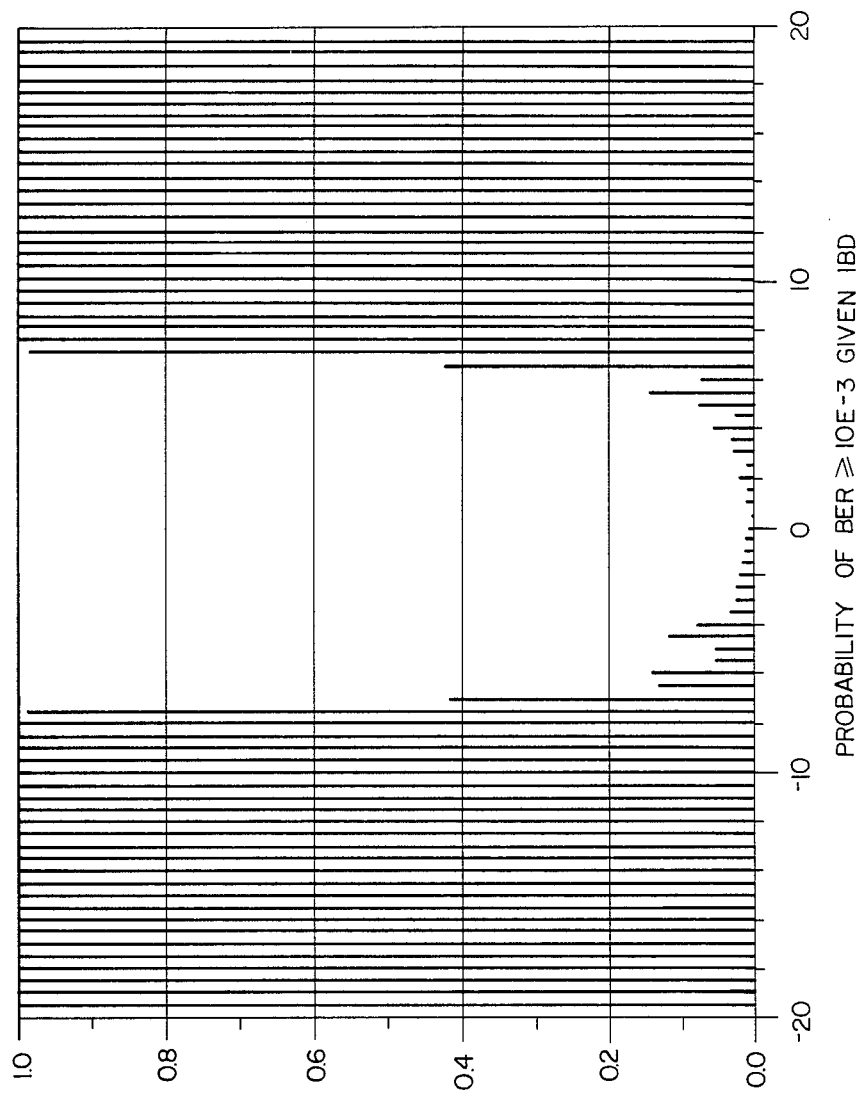
Figure 13:
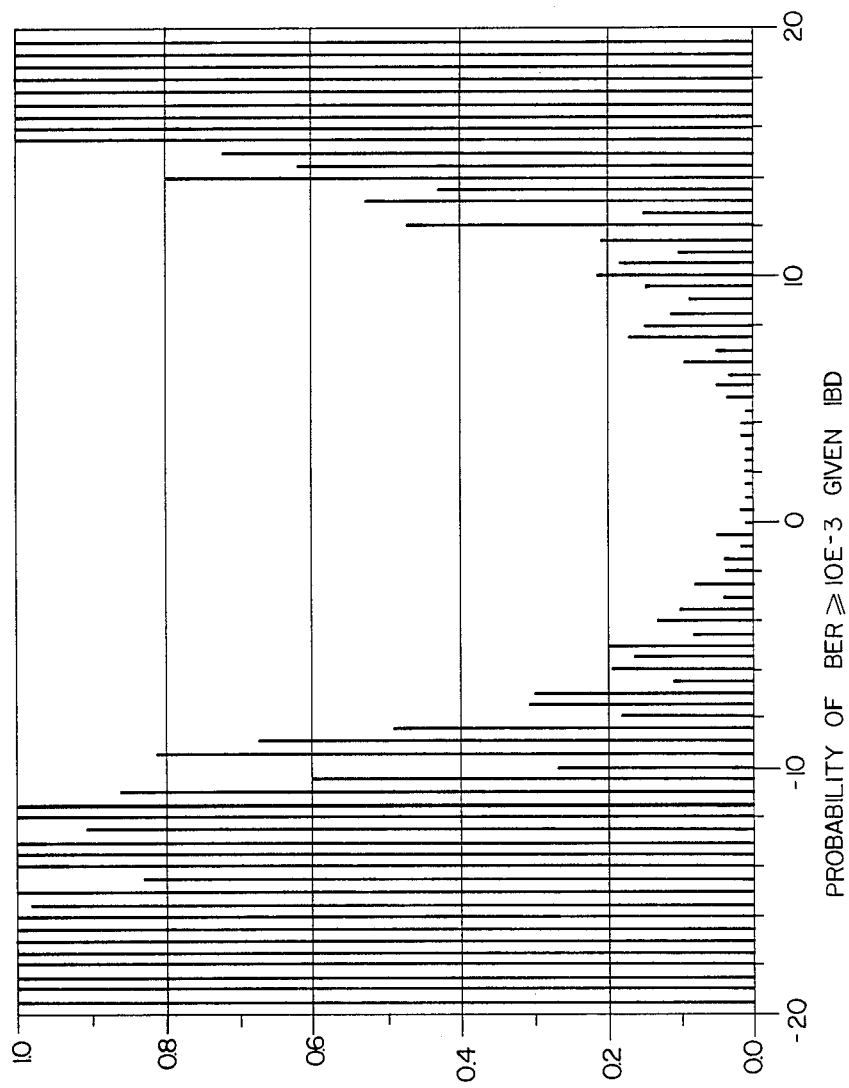
Figure 14:
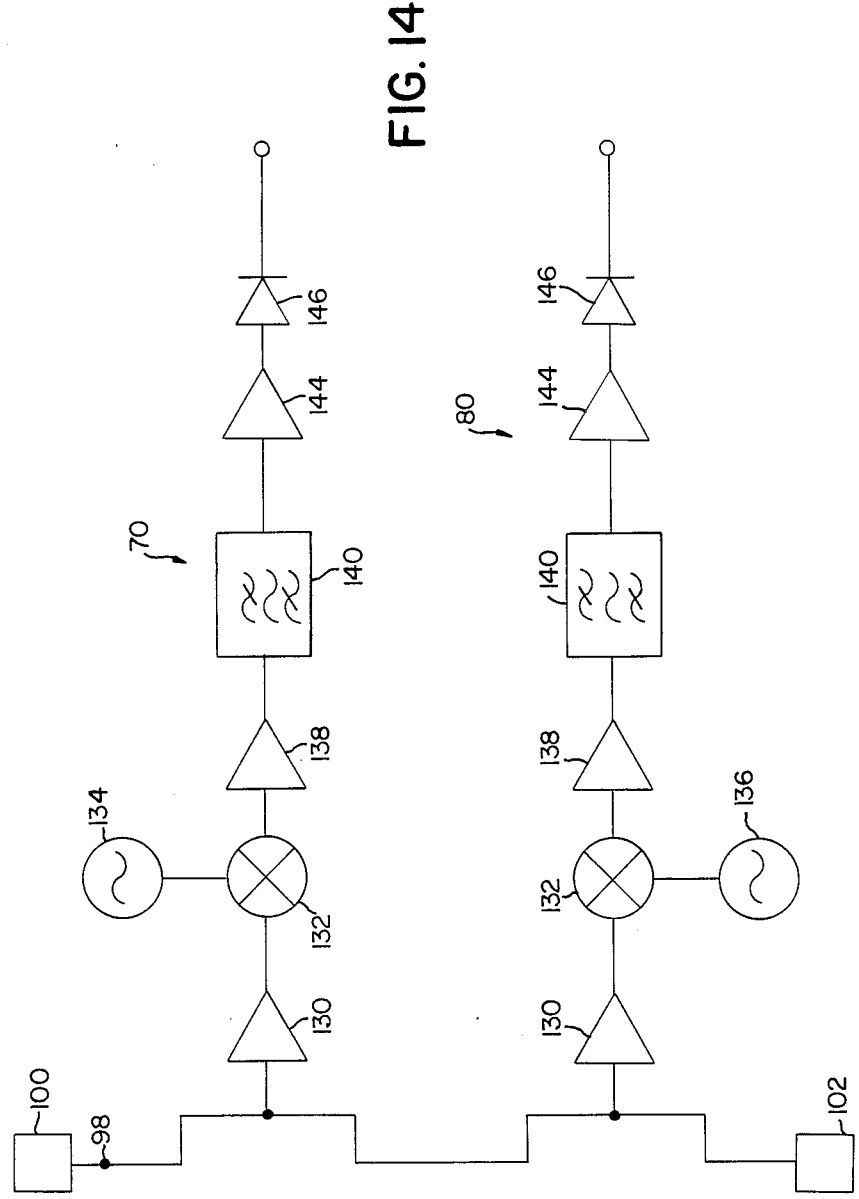
Figure 16:
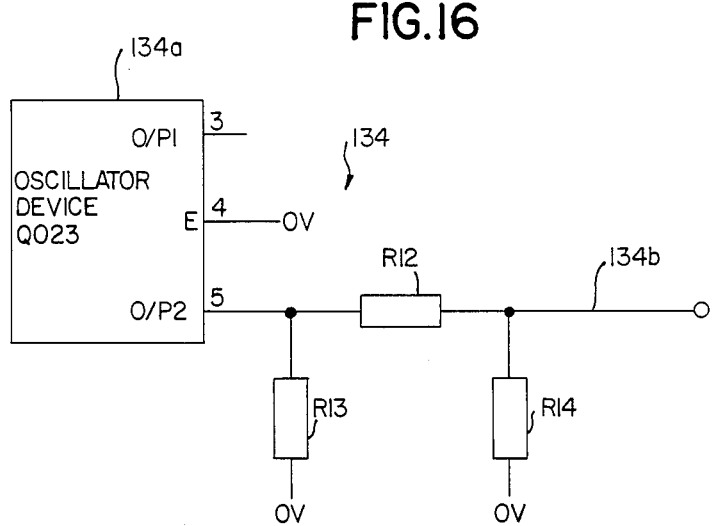
Figure 17:
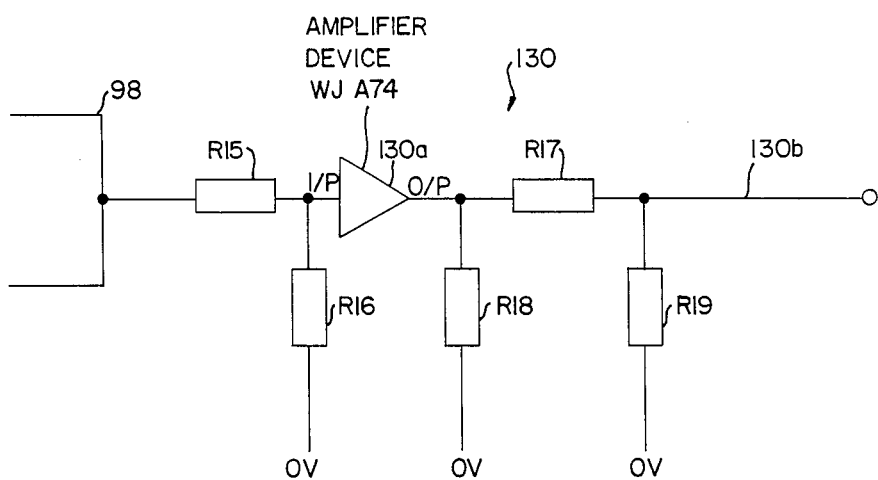
Figure 18:
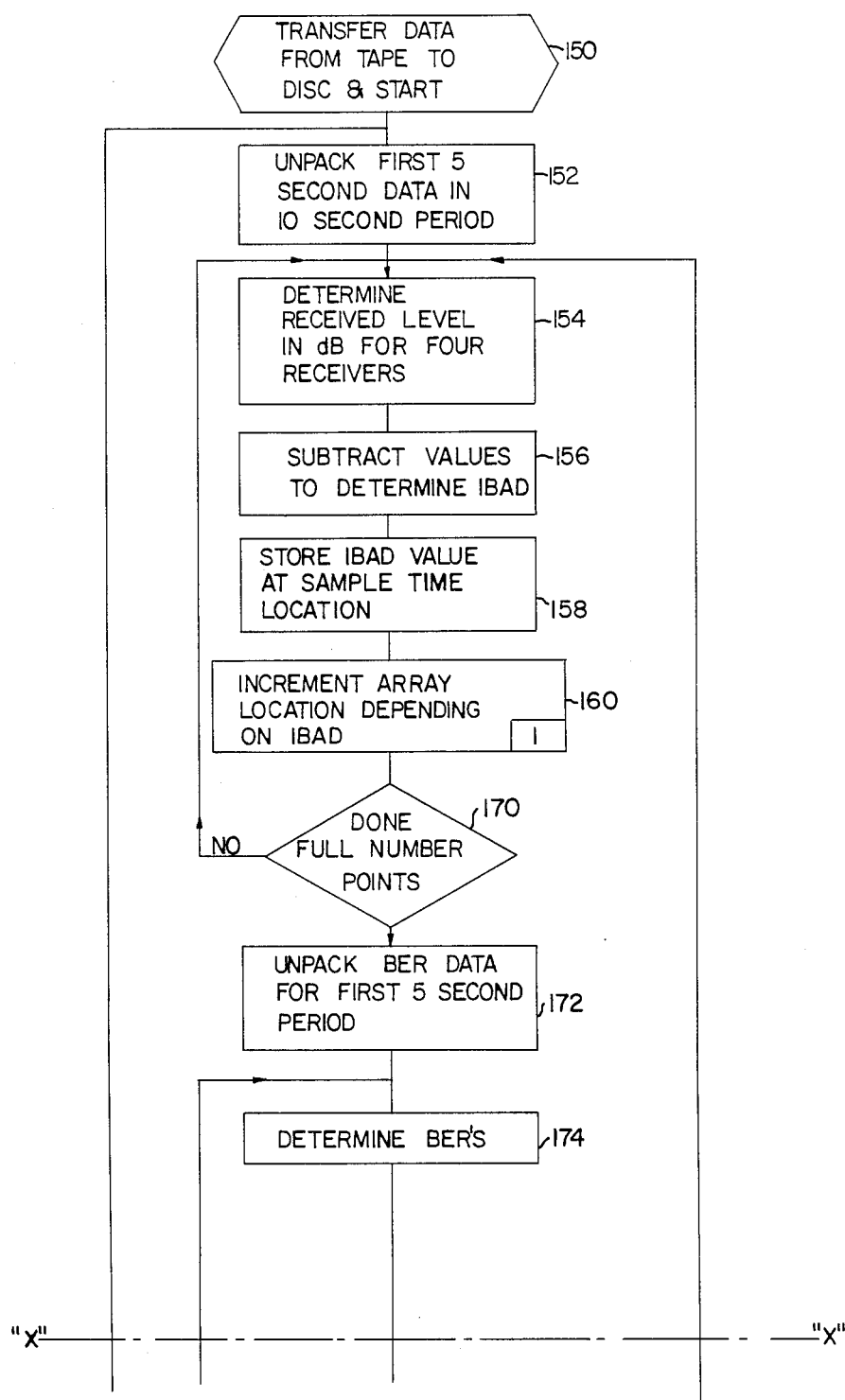
Figure 19:
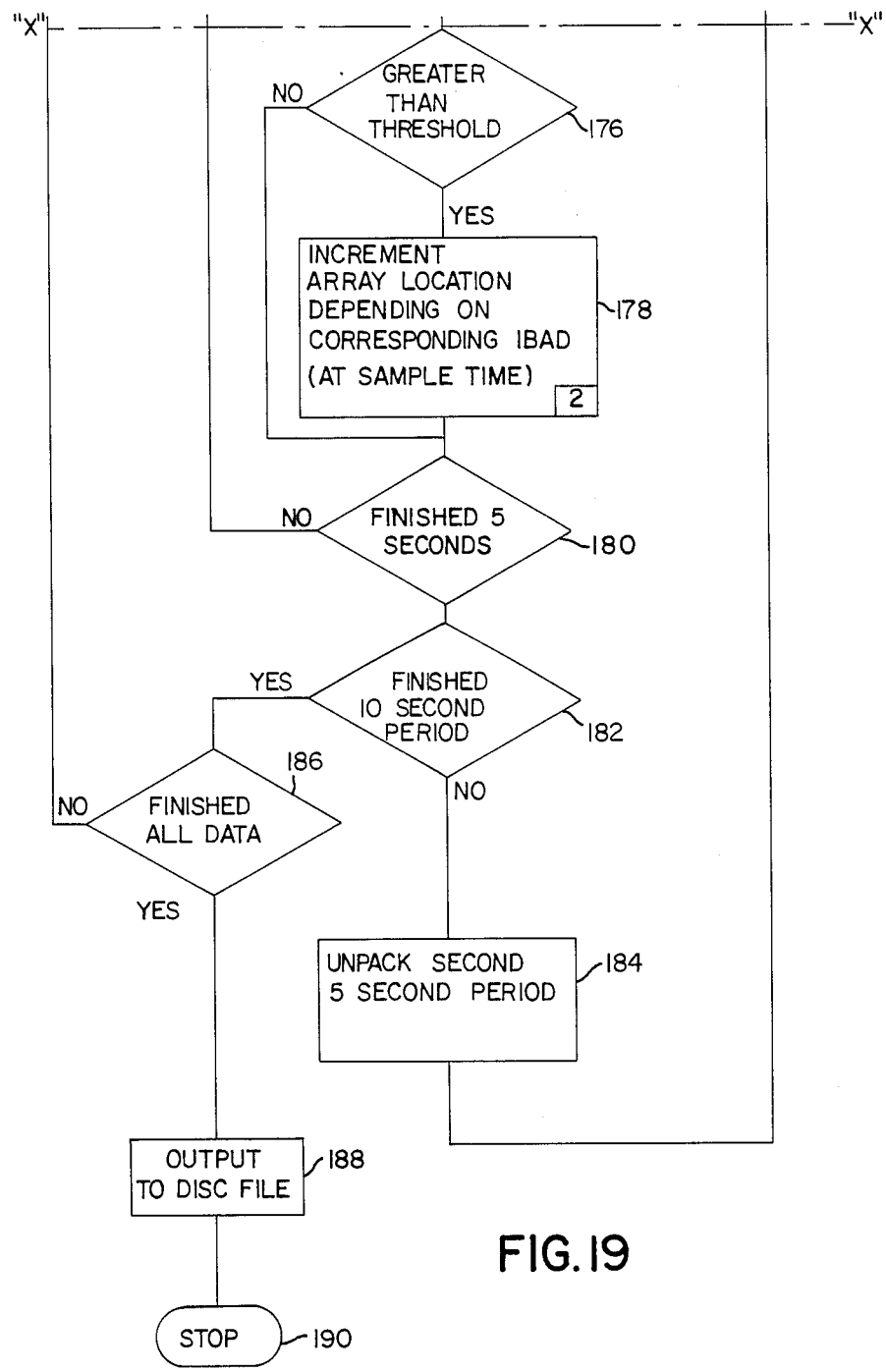

FIGS. 3(a), 3(b) and 3(c) are diagrams illustrating the effect of multipath interference on signal strength over the bandwidth of a radio signal;

FIG. 4 illustrates a prior art simulator for use in testing of radio receivers;

FIG. 5 shows a form of graphical result obtained by use of the simulator of FIG. 4;

FIG. 6 is a block diagram of a dynamic dispersion receiver constructed in accordance with this invention;

FIG. 7 is a block diagram of a system in accordance with the invention for dynamic dispersion testing of digital radio equipment;

FIG. 8 is a block diagram of a system for dynamic dispersion testing of digital radio equipment, in accordance with this invention;

FIG. 9 is a block diagram of a system for field diagnosis of digital radio systems in accordance with the present invention;

FIG. 10 is a histogram obtained by use of the system of FIG. 7, showing numbers of occurrences of in band amplitude dispersions of various values;

FIG. 11 is a histogram obtained by use of the system of FIG. 7, showing numbers of occurrences of in band amplitude dispersions of various values which are substantially coincident with occurrence of greater than a predetermined error ratio in demodulated signals;

FIG. 12 is a histogram obtained by use of the system of FIG. 7, showing probability that the error ratio in demodulated transmissions will exceed a predetermined error ratio at particular in band amplitude dispersions;

FIG. 13 is a histogram like that shown in FIG. 12 but obtained by use of a demodulator different to that used to obtain the histogram of FIG. 12;

FIG. 14 is a block diagram of two narrow band receivers incorporated into the amplitude dispersion receiver of FIG. 6;

FIG. 15 is part of a detailed circuit diagram of one of the narrow band receivers shown in FIG. 14;

FIG. 16 is a detailed circuit diagram of a local oscillator shown in FIG. 14;

FIG. 17 is a detailed circuit diagram of a branching amplifier shown in FIG. 19; and FIGS. 18 and 19 join on the line X—X shown in each to form a flow diagram for data manipulation in accordance with the invention.

Figure 1:
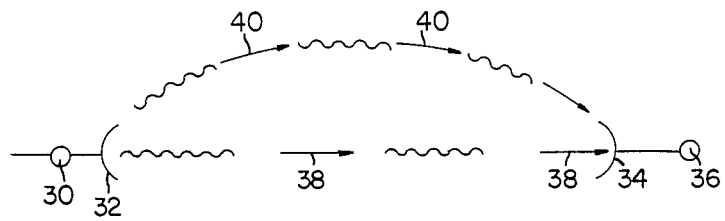
FIG. 1 is a diagram illustrating the mechanism for production of multipath interference in radio signals.
Figure 2:
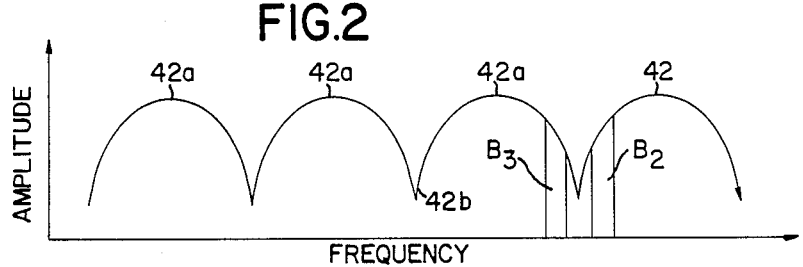
FIG. 2 is a graph illustrating variation in effect of multipath interference with frequency.

In FIG. 1, a radio transmitter 30 is shown arranged for radiation of digitally modulated radio signals from a transmitter antenna 32 to a receiving antenna 34 coupled to a receiver 36 for the radio signals. If component radio signals radiated from antenna 32 do not travel on a single path, such as that denoted by the arrows 38, from the antenna 32 to the antenna 34, but also traverse a different, longer, path such as illustrated by the arrows 40, the antenna 34 will receive a combined signal the magnitude of which will vary considerably with frequency depending upon whether, at any particular chosen frequency, constructive or destructive interference occurs. The effect of this multipath interference is shown in FIG. 2 where the amplitude of received signal is shown by graph 42 as exhibiting a cyclic change with frequency, exhibiting nodes 42a of relatively high signal strength alternating with antinodes or "notches" 42b of substantially reduced signal strength.

FIG. 3(a) shows a typical frequency spectrum of a digitally modulated radio signal. This spectrum is representative of a spectrum which might appertain to, say, a 16QAM digital data transmission system signal. The amplitude of the spectrum envelope is constant across the usable bandwidth of the signal extending to either side of the carrier frequency $f_c$. Circuitry for correctly demodulating the signal is reliant on the presumption that this graph is so configured. However, FIGS. 3(b) and 3(c) illustrate possible distortions of the spectrum envelope occurring, on the one hand, if the bandwidth of the transmitted radio signal falls adjacent to and at one side of a notch 42b, as represented by $B_2$ in FIG. 2, or, adjacent to and at the other side thereof, as shown by $B_3$ in FIG. 2. It will be seen that, in either case, the envelope of the frequency spectrum is distorted from the configuration of FIG. 3(a) to have a rising signal magnitude with increase in frequency or falling magnitude with decrease in frequency. If there is a pronounced distortion of this kind, accurate demodulation of signal information is made difficult and substantial errors may occur in demodulation. The extent to which this phenomenum occurs is dependent upon the relative positions of any notches 42b relative to the bandwidth of the transmitted signal and the relative strengths of the multipath signal components, the effect being worsened with increased relative strength of the non-directly arriving signal components. In a practical environment, both the positions and magnitudes of the notches may vary with variations in atmospheric conditions so that the effects on signal degradation at the receiver are constantly changing. Circuitry may be incorporated into the receiver to compensate for these variations and, in order to test the performance of such circuitry, test setups of various kinds have been used. FIG. 4 shows an exemplary form of apparatus for this purpose.

In FIG. 4, a signal simulator is shown coupled to the output of a generator 50 of digitally modulated signal. The signal may be generated at radio frequency, or some lower frequency such as the intermediate frequency of a receiver to be tested may be employed. Signal branches 51, 53 are coupled to the output of the generator 50 by a suitable coupling device 52. Signal component in branch 51 is passed directly through an attenuator 57 whilst that in path 53 passes firstly through a fixed delay device 54, thence through a variable attenuator 56, and then through a variable phase device 58 which can be adjusted to provide variable phase displacement. Signal components leaving attenuator 57 and device 58 are combined by a suitable coupling device 60 and are thence fed via a variable attenuator 62 to a receiver 64 under test. Where generator 50 generates radio frequency signals, the output from attenuator 62 is applied directly to the receiver input but if the intermediate frequency is generated, the signal is fed to the receiver 64 at a location past the local oscillator.

The attenuators and device 58 are manipulated, whilst monitoring the demodulated output from the receiver 64, to produce a graph 66 of the kind shown in FIG. 5. It will be appreciated that the combined signal components, after travelling through the branches 51, 53 and combining at coupler 60 will interfere in a fashion analogous to the fashion described in relation to signals travelling from the transmitter antenna 32 to the receiver antenna 34 via the two paths shown in FIG. 1. Consequently, by varying the phase difference provided by device 58, a notch analogous to one of the notches 42b described in relation to FIG. 2 can be positioned at any desired location across the bandwidth of the signal, so distorting the envelope of the frequency spectrum such as in fashions analogous to that shown in FIG. 3(b) or 3(c), to an extent which is dependent on the relative strengths of the signal components from the two branches 51, 53. The graph 66 shown in FIG. 5, called a "static notch signature" is made by monitoring the bit error ratio at the output of the amplifier 64 and adjusting the attenuator 56 adjusted for each of a number of different phase differences provided by device 58 until a desired reference bit error ratio exists at the output. Since relative phase difference provided by the device 58 determines the position of notch 42b in the frequency spectrum of the signal, that phase difference can be equated directly to a frequency within the bandwidth of the signal, so that the horizontal axis of the graph of FIG. 5 may be labelled in terms of the phase difference or, as shown, in terms of frequency. The vertical axis of the graph is shown as representing the relative strengths of signal components from branches 51, 53 in the mixed signal applied to the receiver. These relative strengths are determined by the attenuation ratio as between the attenuators 56, 57. The point labelled "0" on the vertical axis of the graph of FIG. 5 illustrates a point at which the attenuator 56 is set to provide no signal flow through branch 53. The point labelled "1" represents a point at which the signal strengths through the two branches are equal. The static notch signature 66 is representative of the notch depth and notch position that will produce a particular bit error ratio in the output data signal. The effect of various forms of compensatory circuitry in the receiver 64 can be assessed by determining whether the signature 66 is affected in a fashion tending to make its encompassed size less or greater. For example, typical variation to the form of the signature 66 occurring through use of known compensatory circuitry on a typical receiver is shown by line 66a in FIG. 5.

As mentioned previously, the plotting of the signature 66 shown in FIG. 5 is time consuming and is generally effected manually, whilst, in any event, it fails to represent performance of the receiver 64 at other than static conditions, where the ratios of attenuations time delays and phase shifts between the combined signal portions varies continually.

Turning now to FIG. 6, there is shown a dynamic dispersion receiver 120 constructed in accordance with the invention. This comprises two receivers 70, 80 arranged to receive on a line 98 the intermediate frequency signal from a receiver under test. These are coupled via analog/digital converters 72, 82 to a dataprocessor system 84 which additionally receives an input, on a line 86, from an error detector 85 monitoring the output from the receiver under test and delivering digital signals to the system 84 indicative of errors (and their magnitudes) in the decoded output from the receiver. The system 84 includes a processor 89, digital/analog converters 88, 90, and a function control device 94 which controls processor 89. Output from the processor 89 is provided on the digital/analog converters 88, 90 which couple to a suitable graphical representation device included in system 84 and comprising for example a cathode ray oscilloscope or the X/Y plotter 87 shown. Processor 89 is controlled in accordance with conventional practice under the function control device 94. The receivers 70 and 80 have narrow bandwidths and are tuned to receive signals in these narrow bandwidths and at frequencies located towards respectively opposite ends of the frequency spectrum envelope of the signal on the inputs thereto. Thus, the receivers may have a bandwidth of 0.5 MHz. The receivers are arranged to provide an output with resolution sufficient to enable resolution of a substantial number of steps in signal applied thereto. It has been found satisfactory to provide for a resolution of 0.5 dB of the signal strength at the particular reference frequencies. These signal magnitudes are repetitively sampled, such as at a rate of ten samples per second and the sample magnitudes converted to digital form by the converters 72, 82 and fed to the dataprocessor system 84. The signal on line 86 applied to the data processor system 84 is in the form of a signal which is pulsed once for every error. A counter of these errors is incorporated in the processor 89, this counter being repetitively up-dated, at a rate corresponding to the sampling rate of converters 72, 82. This count made by the counter in the processor 89 is the number of errors detected in demodulated signal from the receiver under test in a time period corresponding to the period between samplings taken by converters 72, 82. The times of taking of signal samples from receivers 70, 80 may coincide with updating of the output from the error detector or may be at some other time within a sample period. The dataprocessor system 84 is designed to perform the following manipulations on data received:

(1) to subtract one from the other digitised samples representing output from the receivers 70 and 80 at the same time one from the other, to provide in band amplitude dispersion (IBAD) values. The outputs of the receivers are in decibel units so that this subtraction step is equivalent to division of the absolute (linear) magnitudes represented by these outputs.

(2) to provide a count of the numbers of occurrences of the differences, in decibels, generated in manipulation (1) over a range of such differences.

(3) to provide counts analogous to those accumulated in manipulation (2), but excluding from counting those differences which do not coincide with conditioning of line 86 to states indicative that the error ratio in the demodulated data exceeds a predetermined value.

(4) to divide, for each difference, the counts obtained in manipulation (3) by the corresponding counts obtained in manipulation (2).

Referring now to FIG. 7, a radio receiver and demodulator under test are shown designated by reference numerals 100 and 102. The IF output from the receiver is shown connected to the line 98 providing input to the amplifiers 70 and 80 of the dynamic dispersion receiver 120. Line 98 passes through receiver 120 to the demodulator 102. The line 86 to the system 84 is shown connected from the output of error detector 85 associated with the demodulator 102. A digital data generator 106 is provided generating a stream of data signals which may be of random form. These are encoded by a transmitter 108 to form a digitally modulated signal with the intermediate frequency of the receiver 100 arranged as the carrier frequency. The signal is passed through a simulator 110, which may be of similar form to that described in FIG. 4 and designed to provide at its output a combined signal simulating the effect of multipath interference. With generator 106 operating, and with the phase shift device 58 and attenuator device 56 of the simulator 110 manipulated to constantly change the phase shift and amplitude provided thereby, the dynamic dispersion receiver 120 generates and processes data as above described. In particular, the in band amplitude distortion is computed at time spaced intervals and counts thereof for various values are assembled. The plotter 92 is arranged to provide a direct output generating a histogram of these counts and such a histogram is shown in FIG. 10. Since the resolution of the receivers 70, 80 is one half of a decibel, differences between these outputs are representable by one half decibel figures and the plotter 92 is in this instance arranged to display accumulated numbers of occurrences of IBAD for each IBAD value in the range minus 20 to plus 20 dB. The histogram, in this instance, shows a peak for number of occurrences at around the "0" decibel value for IBAD with a rapid falloff with increasing in band amplitude distortion to either side. The plotter 92 directly plots the histogram of the number of occurrences of different values of IBAD coincident with occurrence of detected error ratio in the output of the demodulator being above a predetermined level such as 1 per one thousand data bits. Such a histogram, which shows the results of the above described manipulation (2), is shown in FIG. 11, again with one half decibel resolution over the range minus 20 to plus 20 dB IBAD. This histogram exhibits a typical configuration, having peaks to either side of the "0" decibel position. Finally, the plotter 92 produces a plot such as shown in FIG. 12 generated by manipulation (3) above described, more particularly representing the probability that, for a given value of in band amplitude dispersion, the given error ratio indicated above will be exceeded. The data processor system 84 may be programmed to produce the necessary difference counts by subtraction but commercially available plotters may have the facility to automatically produce such difference counts.

The described histograms may be generated largely automatically by the receiver 120 and plotter 92. Thus, the phase shifting device 58 and the attenuator device 56 may be arranged to automatically scan a range of phase shifts and attenuations corresponding to moving of a response notch across the bandwidth of the signal being processed. This may be effected by, for example, motorising the device or, if desired, by electronic means. The histograms shown in FIGS. 10 and 11 are of interest in themselves. The histogram of FIG. 10 is useful in assessing the overall quality of the input signal to the receiver under test. The histogram of FIG. 11 shows the combined effects of quality of the input signal and the quality of the demodulated signal.

Finally, the histogram of FIG. 12 demonstrates the quality of the receiver and demodulator. Generally speaking, the larger the area enclosed with the somewhat "U" shaped probability curve of this histogram is indicative of the quality of the receiver and demodulator. FIG. 13 illustrates the effect of providing improved demodulating means in the receiver, whereby the configuration of the probability curve is altered to broaden it. The information provided by these histograms makes it possible to ascertain features of the performance of the receiver and demodulator which might otherwise not be noted. This is illustrated in FIG. 13 in that the probability curve, whilst being generally much better configured than that shown in FIG. 12, shows particular peaks which illustrate relatively uneven performance at particular IBAD values. These histograms too, incorporate data obtained in a dynamic situation under changing conditions of the phase difference provided by the device 58 and attenuation device 56 and are thus more representative of actual infield performance.

The dynamic dispersion receiver of the invention is usable in circumstances otherwise than merely for testing of receivers in a laboratory environment. FIG. 8 shows interconnections of components generally similar to those shown in FIG. 7, for infield testing. Here data generator 106 is connected to an on-site transmitter 108 for direction of signals via an antenna 109 to a receiving antenna 111. Thence, the signal is passed through the simulator 110 to the receiver 100. The intermediate frecuency output from the receiver 100 is then passed to the associated demodulator 102 and error detector 85, the intermediate frequency signal itself and the error detection outputs being passed to the dynamic dispersion receiver 120 as in the case of FIG. 7.

Also, as shown in FIG. 9, the dynamic dispersion receiver of the invention may be employed for in-field diagnosis of digital radio system problems. Here, the receiver 120 is shown connected to the output of the intermediate frequency section of a radio receiver 100 and also connected on line 86 to receive the error output from a demodulator 102. Here, the simulator 110 is not provided, the receiver 100 simply receiving at its receiving antenna 111 signal directed from the transmitter 106 via its antenna 109. In this instance, the system may operate to test normal digital traffic signal when multipath fading is occurring as illustrated in FIG. 1.

FIG. 14 shows the arrangement of the receivers 70, 80 in greater detail. The receivers are of generally like form, each having a branching amplifier 130 connected to the line 98 and designed to enable feed-off of signal from line 98 without interference with presentation of the signal to the decoding device of the receiver under test. Output from the branching amplifiers as fed to respective mixers 132. The mixers 132 receive oscillatory signals from respective local oscillators 134, 136. Signal from the mixers 132 is passed to respective amplifiers 138, thence through respective band pass filters 140, through respective amplifiers 144 to respective detectors 146.

The circuit details for the receivers 70, 80 are substantially the same, being in accordance with the representative circuit for the receiver 70 shown in FIGS. 15, 16 and 17. FIG. 15 shows the mixer 132 receiving input on a line 130b from the respective branching amplifier 130 and a line 134b from oscillator 134. The mixed signal is passed via a capacitor C3 to an amplifier device 138a which, together with resistor R1 and capacitor C4, comprises the amplifier 138 of receiver 70. Resistor R1 and capacitor C4 are connected in parallel across the negative supply terminal for the amplifier device 138. Output from the amplifier device 138 is taken directly to the filter 140 which comprises a resistor R3 connected across the output of the amplifier device 138a, a series chain of components comprising resistor R2 and capacitors C5, C7, C9, C11 and C12 connected in that order between resistor R2 and the input of a semiconductor amplifier device 144a which forms part of amplifier 144 of receiver 70. Filter 140 also includes a capacitor C6 and inductance L1 connected from the junction of capacitors C5 and C7 to ground, a capacitor C8 and inductance L2 connected in parallel from the junction of capacitor C7 and capacitor C9 to ground, a capacitor C10 and an inductance L13 connected from the junction between capacitors C9 and C11 to ground, a resistor R4 connected from the junction of capacitors C11 and C12 to ground and a resistor C5 connected from the input of device 144a to ground. In addition to the amplifier device 144a amplifier 144 includes the capacitor C13 shown connecting amplifier device 144a to ground, a resistor R6 connecting the output of device 144a to ground, a series connected capacitor C14 and a resistor R7 connected from the output of device 144a to the emitter of a transistor V1 also forming part of amplifier 144. Transistor V1 has its emitter connected to ground via a resistor R8 and its base connected to ground via a resistor R9 and parallel capacitor C6. The base of the transistor V1 is also connected to positive supply via a resistor R10. Amplifier 144 is thus of conventional form, the device 144a providing for signal amplification and the transistor V1 and associated circuitry serving as a buffer amplifier. Output from the transistor V1 is taken via a ferrite bead 141 to the primary winding of a transformer T1, the primary winding also being connected to positive supply and to ground via capacitor C17. The secondary winding of the transformer T1 has a tuning capacitor C19 connected thereacross and output from the secondary winding is taken to the detector 146 which in this instance comprises a full wave bridge rectifier formed of four diodes D1, D2, D3, D4. Output from the detector is taken via a resistor R11, a capacitor C20 being connected from the output side of resistor R11 to ground.

The local oscillators 134, 136 are of generally similar form although tuned to different local oscillator frequencies. Each may be of the form shown in FIG. 16 for the local oscillator 134. Here, the local oscillator 134 is shown as comprising a semiconductor oscillator device 134a having its output connected via a matching pad comprised of three resistors R12, R13, R14 to a line 134b which provides connection to the mixer 132.

The branching amplifiers 130 for each receiver 70, 80 are likewise of similar form and may be as shown in FIG. 17, more particularly comprising a semiconductor amplifier device 130a having its input connected to line 98 via a resistor R15. The input to the device 130a is connected to ground via a resistor R16. The output from device 130a is taken from a matching pad comprised of resistors R17, R18, R19 to a line 130b providing connection to the mixer 132.

In an experimental device constructed in accordance with the invention, the mixer 132, amplifier device 138a, amplifier device 144a, transistor V1, oscillator device 134a and amplifier device 130 were commercially available components comprised as follows:
mixer 132: device type MCLSRA-1
amplifier device 138: SL5600
amplifier device 144a: SL5600
transistor V1: 2N5223
oscillator device 134a: QO23
amplifier device 130a: device type WJA74.

.The components for the filters 140 are selected, in accordance with usual practice, to provide the necessary band pass characteristics to discriminate against signals of frequency not corresponding to the mixed signal components from the mixers 132 which relate to the desired narrow band frequencies for operation of the amplifiers 70, 80. In a practical embodiment constructed in accordance with the invention, and intended for use with a 16QAM 140 Mbit/s system utilizing a 70 MHz intermediate frequency with a bandwidth of approximately 35 MHz it was found satisfactory to arrange the filters 140 to be tuned to a frequency of 29.8 MHz with a bandwidth of approximately 500 KHz. In this case, local oscillators 134, 136 operated at 25.2 MHz and 114.8 MHz. This provided, for amplifier 70, a selection of a 500 KHz wide segment of the total bandwidth of the incoming signal, centered on 55 MHz (i.e. towards the lowest end of the bandwidth) and for amplifier 80 a 500 KHz segment located at 85 MHz (i.e. adjacent the upper range of the bandwidth of the incoming signal).

FIGS. 18 and 19 show data processing steps for producing data for making the plots such as those shown in FIGS. 10, 11, 12 and 13. This flow chart has been found suitable for implementation with a commercial dataprocessor Honeywell type H6000. The implementation enables data processing, where the data represented by output from the converters 72 and 82 is presented indirectly to the dataprocessor system 84 of the receiver 120, having been pre-recorded on tape. The system is designed for implementation where the data is so-presented is arranged in the tape with blocks of data representing samples taken at ten per second and recorded as two consecutive sub-blocks each having data for two consecutive five second data periods. In the first step, indicated at 150, the data is taken from the storage tape to a disc storage associated with the dataprocessor 84. In a second step, labelled 152, the first five second subblock of data in one of the aforementioned ten second full data blocks is unpacked. In a third step indicated at 154, the signal levels from the analog to digital converters 72, 82 are converted to decibel indications. In this regard, there is, generally, a non-linear relationship between the voltage delivered by the receivers 70 and 80 and the actual decibel levels indicated thereby and the step 154 is therefore necessary to convert the signal levels to decibels. At a step 156, the difference between the two decibel levels determined in step 154 is determined to give the IBAD values. In a step 158, these IBAD values are stored in a fashion enabling them to be later read out together with information indicating the time at which the IBAD values were determined in the five second data capture period. Next, at a step 160, memory locations in a random address memory are incremented depending on the IBAD values stored at step 158. Thus, for each occurrence of a particular IBAD value, within the fifty sample period, a corresponding location for accumulation of numbers of occurrences of that IBAD value is incremented by one unit. At a step 170, the number of points in the data period is counted and when the full number for the five second period has been fulfilled, the program moves to step 172 as shown where, stored data transferred from the aforementioned tape to the disc at step 150 and detailing the bit error ratio as supplied on line 86 is unpacked. Then, in a step 174, the accumulated bit error ratios for consecutive sample periods within the five second data period are computed by accumulation of bit error counts within each such period. Next, in a step 176, the so determined bit error ratios are compared with a threshold value representing the desired bit error ratio to be used in forming the histogram of FIG. 11. If these are determined not to be greater than this threshold, this information is transferred for use in a subsequent step 180. If they are determined to be greater, incrementation of a memory array location is effected in correspondence with the corresponding IBAD value relating to the time period for which that bit error ratio was computed. This is effected in conjunction with information stored in step 158. That is to say, if a particularly stored IBAD value is found to occur when the bit error ratio at a corresponding sample time was greater than the threshold established in step 176, an array location, for storage of accumulated counts of occurrence of that IBAD value under the condition that the error threshold is exceeded, is incremented at step 178. At a step 180, a determination is made as to when the whole of the five second data sub-pack has been processed. On completion of the five second data sub-pack, as determined at step 180, the program starting from step 154 is repeated for the second five second data period. At a step 182, a determination is made as to when a full ten second data period has been processed and if so determination is then made at a step 186 as to whether all of the data to be processed has been so processed. If not all data has been processed, the program is begun again from step 152 by unpacking of the first five second data period for the next ten seconds of data. In the event that all data is determined as being finished at step 186, the program proceeds to step 188 to output data to a disc file and thence to proceed to stop the program at step 190.

In this specification, including the appended claims, references to mathematical operations such as division or multiplication, where quantities are expressed in ordinary "linear" units, are to be understood as including references to corresponding mathematically equivalent operations where the quantities are expressed in other units. For example, operations where quantities are expressed in linear units, and involving division or multiplication, are equivalent to operations involving subtracting or adding the equivalent logarithmic (e.g. "decibel") values of those quantities. Conversely, references to mathematical operations specified in relation to quantities expressed in decibels are to be taken as references to mathematically equivalent operations on the quantities when expressed in linear units. In the described embodiments, the accumulated counts of the number of occurrences of IBADs of particular values, and the accumulated counts of occurrences of IBADs of particular values which correspond with the measured error ratio crossing a predetermined level, are divided one into the other. This count division is to be taken as implying division of absolute or linear values of the counts or as implying any equivalent mathematical operation. For example, the counts could themselves be expressed in decibels or other logarithm units, such that the division was effected by subtraction of those so expressed counts. Thus references in this specification, including the appended claims, to "division" of these counts are to be taken as encompassing division by any mathematically equivalent process.

While the invention has been specifically described in relation to characterisation of digitally modulated signals, the invention is equally applicable to characterisation of analogue modulated signals. In this case, instead of monitoring the error ratio as described another suitable parameter describing the signal quality of the demodulated carrier signal may be monitored. For example the signal to noise ratio of the demodulated signal may be so monitored. Then, the method of the invention may be practised by accumulating numbers of occurrences of IBADs of respective different values, and the numbers of occurrences of respective IBADs of different values and which at least coincide with the value of the relevant parameter, such as signal to noise ratio, crossing a predetermined level. Divided counts obtained by division of the second of these counts by the first mentioned are then obtained in an analogous way to that described in relation to digital signal characterisation.

A program listing for execution of the program described in FIGS. 18 and 19 follows:

PROGRAM LISTING

```
10$$N,J,MONI
20$:ident:r14am03502,1h1v rescs for M. Bruce
30$:option:fortran,nomap
40$:forty:nlno,nform,ascii,nlstin,ndeck
50$:limits:30k
60c
70c       PROGRAM /MB/IBDIST
80c       Program written by P. FEDER modified by J.ADAMS , March 1983 ,
90c       and M.Bruce, January 1984
100c      This program extracts BER and IBD information from
110c      data tapes and when BER > 1E-03 the IBD is rounded to
120c      the nearest 0.5 db . A result file which covers the range
130c      -20.0 db to +20.0 db in 0.5 db steps (ie. 81 steps) for the
140c      six channels then has a position in the array corresponding
150c      to the value of IBD and the channel number incremented by one .
160c      The result is an array giving the relative probability the IBD
170c      will have a particular value ( +-0.5 db ) when the BER > 1E-03
180c      for all six channels.
190c
200       integer   CH1(50) , stime , ftime , BERC(50) , val , val2
210       integer   BERCP(150) , ERRNO(50) , Nrbx1(200) , Nrbx3(200)
220       real Nrbx4db,Nrbx2db,RNrbx2,RNrbx4
230       integer Nrbx2(200) , Nrbx4(200)
240       real IBD(50) , IBDC(50) , FINIBD(9,161) , aober(8)
250       real Nrbx1db , Nrbx3db , RNrbx1 , RNrbx3
260       common/aa/idata(1230)
270       Jmin= 256
280       Jmax= 0
290       L= 0
300       n = 0
310c
320       do 5 i = 1,161
330       FINIBD(1,i) = float(i - 1)/2.0 - 20.0
340     5 continue
350c
360       call setup(irec,stime,ftime)
370       length= 50
380       itv=0;  icount=0
390c
400       do 11 i=1,8
410       aober(i)=0
420       do 8 j = 1,161
430       FINIBD(i+1,j) = 0.0
440     8 continue
450    11 continue
460c
470       iset1=0
480c
490c      itv is counter for no. times called unpack for each record
500c      itv=1 => 1st type package to be unpacked
```

```
510c        itv=2 => 2nd type package to be unpacked
520      10 call input(irec,stime,ftime,itime,$30)
530         iber1=301; iber2=450
540         IBD1=1201; IBD2=1400; IBD3=1601; IBD4=1800; IBD5=2000
550      25 continue
560         itv=itv+1
570         call unpack(IBD1,IBD2,Nrbx1,200)
580         call unpack((IBD2 + 1),(IBD3 - 1),Nrbx2,200)
590         call unpack(IBD3,IBD4,Nrbx3,200)
600         call unpack((IBD4 + 1),IBD5,Nrbx4,200)
610c
620         do 50 k = 4,200,4
630c
640c        Calibrate Nrbx data into db by means of a cubic
650c
660c        Cubic Calibration Coefficients
670         a1=-14.751; b1=0.61844; c1=-8.6462E-03; d1=5.3849E-05
680         a2=-14.066; b2=0.52676; c2=-6.10617E-03; d2=3.0935E-05
690         a3=-14.426; b3=0.56883; c3=-6.8725E-03; d3=3.6437E-05
700         a4=-14.152; b4=0.60496; c4=-8.03040E-03; d4=4.6782E-05
710c
720         RNrbx1 = float(Nrbx1(k))
730         RNrbx2 = float(Nrbx2(k))
740         RNrbx3 = float(Nrbx3(k))
750         RNrbx4 = float(Nrbx4(k))
760c
770         Nrbx1db = a1 + b1*RNrbx1 + c1*RNrbx1**2 + d1*RNrbx1**3
780         Nrbx2db = a2 + b2*RNrbx2 + c2*RNrbx2**2 + d2*RNrbx2**3
790         Nrbx3db = a3 + b3*RNrbx3 + c3*RNrbx3**2 + d3*RNrbx3**3
800         Nrbx4db = a4 + b4*RNrbx4 + c4*RNrbx4**2 + d4*RNrbx4**3
810c
820c        Determine the In Band Dispersion
830         IBD(k/4) = Nrbx3db - Nrbx1db
840         IBDC(k/4) = Nrbx4db - Nrbx2db
850         val2 = INT(2.0 * (IBDC(k/4) + 20.25) )
860         val = INT(2.0 * (IBD(k/4) + 20.25) )
865         if (val.lt.1.or.val.gt.81) go to 49
870         FINIBD(2,val) = FINIBD(2,val) + 1
875      49 if (val2.lt.1.or.val2.gt.81) go to 50
880         FINIBD(3,val2) = FINIBD(3,val2) + 1
890      50 continue
900c
910         do 808 m=1,6
920         ib1=iber1+(m-1)*150;  ib2=iber2+(m-1)*150
930         call unpack(ib1,ib2,BERCP,150)
940         L=L+50
950c
960c        ber samples are composed of 24 bits. So 3 elements
970         do 60 i=1,50
980         j=3*(i-1)+1
990         BERC(i)=BERCP(j)+BERCP(j+1)*2**8+BERCP(j+2)*2**16
1000     60 continue
1010c
1020c       set first error count of event to be zero
1030        ober=aober(m)
1040        if (icount.eq.0) ober=BERC(1)
```

```
1050      tv1=BERC(1)-ober;   ERRNO(1)=tv1
1060      if (BERC(1).lt.ober)  ERRNO(1)=tv1+2**24
1070      ober=BERC(1)
1080c
1090      do 400 i=2,50
1100      if (BERC(i).eq.0) ober=0.0
1110      ERRNO(i)=BERC(i)-ober
1120      if (ERRNO(i).lt.0)   ERRNO(i)=ERRNO(i)+2**24
1130      ober=BERC(i)
1135  400 continue
1140c
1150c     Data is transmitted at a rate of 34.368 Mbit/sec and
1160c     ERRNO(1) is over a 0.1 sec time interval. Hence when
1170c     ERRNO(1) < 34.368E 02 , BER < 1.0E-03 .
1175      Do 403 i = 1,50
1180      if (ERRNO(i).LT.34.368E 02) go to 403
1190      n = n + 1
1200      if (m.LT.3) val = INT(2.0 * ( IBD(i) + 20.25) )
1210      if (m.GE.3) val = INT(2.0 * ( IBDC(i) + 20.25) )
1220      if (val.lt.1.or.val.gt.81) go to 403
1230      FINIBD(m+3,val) = FINIBD(m+3,val) + 1
1240  403 continue
1250c
1260      aober(m)=ober
1270  808 continue
1280c
1290c     Now unpack 2nd type 1 package in record
1300      iber1=2761;   iber2=2910
1310      IBD1=3661; IBD2=3860; IBD3=4061; IBD4=4260; IBD5=4460
1320      icount=icount+1
1330      if (itv.eq.1)  goto 25
1340      itv=0
1350      goto 10
1360c
1370   30 call detach(8,ist,)
1380      L=L/6
1390      write(6,850)"L =",L,"  n = ",n
1400  850 Format(v)
1410      write(33,999) ((FINIBD(i,j), i =1,9), j =1,81)
1420  999 format(4(1x,E13.6))
1430      stop
1440      end
1450c
1460c *****************************************
1470c           SUBROUTINES
1480c *****************************************
1490c
1500c
2010c
2020      time= iyear*100000000 + imonth*1000000
2030&           + iday*10000 + ihour*100 + imin
2040c
2050      if ( time .LT. stime ) goto 10
2060      if ( time .GT. ftime ) goto 20
2070      return
```

```
2080 20    return 1
2090       end
2100c
2110c      ****************************************
2120c
2130       subroutine unpack(Jd,Kd,ndata,length)
2140c
2150c      This subroutine unpacks idata into
2160c      ndata from the initial dataword (Jd)
2170c      to the final dataword (Kd).
2180c      Note: 4 datawords --> 1 taconetwords
2190c      length specifies the dimension of ndata
2200c
2210       common/aa/idata(1230)
2220       dimension ndata(length)
2230       J= (Jd + 3)/4
2240       K= ( Kd )/4
2250       N= mod(Jd+3,4) + 1
2260       L= mod( Kd ,4) + 1
2270       M= 2 - N
2280       do 50 I=J,K
2290       goto(10,20,30,40),N
2300 10    ndata( M )= fld( 1,8,idata(I))
2310 20    ndata(M+1)= fld(10,8,idata(I))
2320 30    ndata(M+2)= fld(19,8,idata(I))
2330 40    ndata(M+3)= fld(28,8,idata(I))
2340       M= M + 4
2350       N= 1
2360 50    continue
2370       I= I + 1
2380       goto(90,80,70,60),L
2390 60    ndata(M+2)= fld(19,8,idata(I))
2400 70    ndata(M+1)= fld(10,8,idata(I))
2410 80    ndata( M )= fld( 1,8,idata(I))
2420 90    return
2430       end
2440$:execute
2450$:limits:15,40K
2460$:prmfl:33,w,s,r014/mb/data1bd
2470$:prmfl:63/x2d,r,s,r000/dummy
```

This program permits processing of two sets of data obtained from two separate amplifier dispersion receivers 120 and also permits accumulation of, for each such data set, assembly of data for production of six histograms of the form shown in FIG. 11 from data from six different types of demodulator.

The plotting of histograms of FIGS. 10, 11 and 12 is effected from the data stored at steps 158 and 178 in the flow chart of FIG. 18. Programs of well known form may be used to divide, for each IBAD value, the stored counts in the arrays of such counts stored at steps 158 and 178, for the purpose of generating values for plotting the histogram of FIG. 12.

Although the described implementation operates for pre-recorded data the data processing program may be readily adapted to operate on real-time data with a dedicated processor system, such as Motorola type M68000.

The described method and apparatus generates a plot such as shown in FIG. 12 representing the probability that, for a given value of in band amplitude dispersion, the given error ratio indicated above will be exceeded. The method and apparatus may however be modified for generation of an "inverse" plot representing the probability that, for a given value of in band amplitude dispersion, a given error ratio will not be reached. In this instance, the plotter 92 may simply be set to plot the histogram of the number of occurrences of different values of IBAD coincident with occurrence of detected error ratio in the output of the amplifier being below a predetermined level such as 1 per one thousand data bits.

The invention has been described merely by way of example only and many modifications may be made thereto without departing from the spirit and scope of the invention as defined in the appended claims.

I claim:

1. A method of characterising a modulated carrier signal comprising:
   (a) repetitively generating samples of in band amplitude dispersion of the signal at time spaced intervals;
   (b) accumulating first counts of numbers of occurrences of respective in band dispersion values over a range thereof;
   (c) decoding said modulated carrier signal;
   (d) monitoring a parameter indicative of signal quality of said decoded carrier signal;
   (e) accumulating second counts of numbers of occurrences of respective in band amplitude dispersions of said values within said range, and which last mentioned in band amplitude dispersions at least substantially coincide with the value of said parameter crossing a predetermined level; and
   (f) dividing one of said first and second counts for each said in band amplitude disperison value by the the other of said first and second counts therefor, to obtain respective divided counts each representative of the probability that, at the respective in band amplitude dispersion value, the value of said parameter will cross said predetermined level.

2. A method as claimed in claim 1 including generating from said first counts a first histogram of frequency of occurrence of the various in band amplitude dispersion values.

3. A method as claimed in claim 1 including generating from said second counts a second histogram of frequency of occurrence of the various in band amplitude dispersion values which coincide with occurrence of the aforementioned predetermined level of said parameter being crossed.

4. A method as claimed in claim 1 including generating from said divided counts a third histogram of probabilities that, at various in band amplitude dispersion values, the value of said parameter will cross said predetermined level.

5. A method as claimed in claim 1 wherein said modulated signal is a directly received radio signal.

6. A method as claimed in claim 1 wherein said modulated signal is a derived signal derived from a received radio signal.

7. A method as claimed in claim 6 wherein said derived signal is an intermediate frequency signal.

8. A method as claimed in claim 1 wherein said modulated carrier signal and said decoded carrier signal each have a signal magnitude, and said in band amplitude dispersion samples are generated by a procedure of sampling, at substantially corresponding times, signal magnitudes at two different frequencies within the bandwidth of said modulated carrier signal, and dividing the sampled signal mangitudes at one said frequency by sampled signal magnitudes at the other said frequency taken at corresponding times.

9. A method as claimed in claim 8 wherein said in band amplitude dispersion is determined by algebraic combination of more than two samples thereof at respective different frequencies.

10. A method as claimed in claim 1 wherein said dispersions are assigned as negative or positive values depending upon whether the magnitudes of sampled signals associated with a particular one of said two different frequencies are greater or less than the corresponding sampled signals associated with the other of said two frequencies.

11. A method as claimed in claim 1 wherein said in band amplitude dispersion is determined by algebraic combination of more than two samples thereof at respective different frequencies.

12. A method as claimed in claim 11 and further including the step of distorting said modulated carrier signal by mixing of signal components of the same frequency where the phase and amplitude relationship between the components is continually varied.

13. A method as claimed in claim 1 and further including the step of distorting said modulated carrier signal by mixing of signal components of the same frequency where the phaes and amplitude relationship between the components is continually varied.

14. A method as claimed in claim 13 wherein said phase and amplitude relationship is continuously varied.

15. A method as claimed in claim 14 wherein said carried signal is substantially randomly distorted.

16. A method as claimed in claim 15 wherein the range of variations of phase and amplitude between the signal components is selected so as to cause a notch in the frequency spectrum of the combined signal to move back and forth across the full bandwidth of that signal.

17. A method as claimed in claim 1 wherein said crossing by said parameter of said predetermined level comprises an exceeding of said predetermined level.

18. A method as claimed in claim 1 wherein said crossing by said parameter of said predetermined level comprises a falling of said parameter below said predetermined parameter.

19. A method for characterising a modulated carrier signal as claimed in claim 1 wherein said modulated carrier signal is a digitally modulated carrier signal and said parameter comprises the error ratio in the digitally modulated carrier signal.

20. A method for characterising a modulated carrier signal as claimed in claim 1 wherein said modulated carrier signal is an analogue modulated carrier and said parameter comprises signal to noise ratio of analogue modulated carrier signal.

21. A method of characterising a modulated carrier signal comprising:
   (a) repetitively genernating samples of in band amplitude dispersion of the signal at time spaced intervals by generating signals representing logarithms of magnitudes of the sampled signal;
   (b) accumulating first counts of numbers of occurrences of respective in band dispersion values over a range thereof;
   (c) decoding said modulated carrier signal;
   (d) monitoring a parameter indicative of signal quality of said decoded carrier signal by generating signals representing logarithms of magnitudes of the decoded carrier signal;
   (e) accumulating second counts of numbers of occurrences of respective in band amplitude dispersions of said values within said range, and which last mentioned in band amplitude dispersions at least substantially coincide with the value of said parameter crossing a predetermined level; and
   (f) dividing one of said first and second counts for each said in band amplitude dispersion value by the other of said first and second counts therefor by subtracting one such logarithm signal from the other, to obtain respective divided counts each representative of the probability that, at the respective in band amplitude dispersion value, the value of said parameter will cross said predetermined level.

22. A method as claimed in claim 21 wherein said two different frequencies are spaced by equal frequency differences from the carrier frequency.

23. Apparatus for characterising a modulated carrier signal comprising:
   (a) means for generating time spaced samples of in band amplitude dispersion of the signal;
   (b) means for accumulating first counts of numbers of occurrences of respective in band dispersion values, over a range of said values;
   (c) means for demodulating said modulated carrier signal;
   (d) means for monitoring a parameter indicative of signal quality of said demodulated carrier signal;
   (e) means for accumulating second counts of numbers of occurrences of respective in band amplitude dispersions of said values within said range, and which last mentioned in band amplitude at least substantially coincide with the value of said parameter crossing a predetermined level; and
   (f) means for dividing one of said first and second counts for each said in band amplitude dispersion value by the other of said first and second counts therefor, to obtain respective divided counts each representative of the probability that, at the respective in band amplitude dispersion value, the value of said parameter will cross said predetermined level.

24. Apparatus as claimed in claim 23 wherein said means for generating samples of in band amplitude dispersion comprises two receiver devices each in use receiving said modulated carrier signal and responsive to separate frequency signal components within the bandwidth of said modulated carrier signal, and said means for dividing divides the magnitudes of the separate frequency signal components one by the other.

25. Apparatus for characterising a modulated carrier signal comprising:
   (a) means for generating time spaced samples of in band amplitude dispersion of the signal that includes two receiver devices each in use receiving said modulated carrier signal and responsive to separate frequency signal components within the bandwidth of said modulated carrier signal to generate outputs representing logarithmic equivalents of magnitudes of said modulated carrier signal;
   (b) means for accumulating first counts of numbers of occurrences of respective in band dispersion values, over a range of said values;
   (c) means for demodulating said modulated carrier signal;
   (d) means for monitoring a parameter indicative of signal quality of said demodulated carrier signal;
   (e) means for accumulating second counts of numbers of occurrences of respective in band amplitude dispersions of said values within said range, and which last mentioned in band amplitude dispersions at least substantially coincide with the value of said parameter crossing a predetermined level; and
   (f) means for dividing one of said first and second counts for each said in band amplitude dispersion value by the other of said first and second counts therefor by subtracting the output of one said receiver from the output of the other, to obtain respective divided counts each representative of the probability that, at the respective in band amplitude dispersion value, the value of said parameter will cross said predetermined level.

26. Apparatus as claimed in claim 23 or claim 24 wherein said crossing by said parameter of said predetermined level comprises an exceeding of said predetermined level.

27. Apparatus as claimed in claim 23, claim 24 or claim 25 wherein said crossing by said parameter of said predetermined level comprises a falling of said parameter below said predetermined parameter.

28. Apparatus as claimed in any one of claims 23, 24 or 25 comprising further means for generating a first histogram of frequency of occurrence of the various in band amplitude dispersion values.

29. Apparatus as claimed in any one of claims 23, 24 or 25, comprising further means for generating a second histogram of frequency of occurrence of the various in band amplitude dispersion values which coincide with occurrence of the aforementioned predetermined level of said parameter being crossed.

30. Apparatus as claimed in any one of claims 23, 24 or 25 comprising further means for generating a third histogram of probabilities that, at various in band amplitude dispersion values, the value of said parameter will cross said predetermined level.

31. Apparatus as claimed in any one of claims 23, 24 or 25 for characterising a digitally modulated carrier signal, wherein said means for monitoring said parameter comprises means for monitoring the error ratio in said digitally modulated carrier signal.

32. Apparatus as claimed in any one of claims 23, 24, or 25 for characterising an analogue modulated carrier signal, wherein said means for monitoring said parameter comprises means for monitoring the signal to noise ratio of said analogue modulated carrier signal.

* * * * *

UNITED STATES PATENT AND TRADEMARK OFFICE
CERTIFICATE OF CORRECTION

PATENT NO. : 4,766,600
DATED : August 23, 1988
INVENTOR(S) : Andrew L. Marin

Page 1 of 2

It is certified that error appears in the above-identified patent and that said Letters Patent is hereby corrected as shown below:

Column 2, line 22, change "paramater" to --parameter--;
         line 25, change "accumalating" to --accumulating--.

Column 6, line 42, add --a-- before "typical";
         line 64, delete "-" after --digital--.

Column 7, line 41, add --.-- at the end of the line.

Column 9, line 18, change "frecuency" to --frequency--

Columns 17 and 18, after 1500c, insert the information set out on the attached sheet.

Column 22, claim 13, line 13, change "phaes" to --phase--;
         claim 20, line 39, add --the-- before "analoque--;
         claim 21, line 43, change "genernating" to --generating--.

Column 23, claim 23, line 20, add --dispersions-- before --at--.

Signed and Sealed this

Twenty-sixth Day of September, 1989

Attest:

DONALD J. QUIGG

Attesting Officer

Commissioner of Patents and Trademarks

```
1510c ******************************************
1520c
1530      subroutine setup(irec,stime,ftime)
1540c
1550c This subroutine determines the starting and finishing
1560c times of interest, and attaches the random binary input
1570c file
1580c
1590      parameter syear= 83 , smonth= 12 , sday= 17 ,
1600&               shour= 23 ,   smin= 00 ,
1610&               fyear= 83 , fmonth= 12 , fday= 18 ,
1620&               fhour= 06 ,   fmin= 00
1630c
1640      integer  stime , ftime
1650c
1660      irec= 0
1670c
1680      stime= (syear-68)*100000000 + smonth*1000000
1690&          + sday*10000 + shour*100 + smin
1700      ftime= (fyear-68)*100000000 + fmonth*1000000
1710&          + fday*10000 + fhour*100 + fmin
1720c
1730      call attach(8,"r000/r014/rdata1;",1,1,ist,)
1740      call ransiz(8,1230,1)
1750c
1760      return
1770      end
1780c
1790c ******************************************
1800c
1810      subroutine input(irec,stime,ftime,time,*)
1820c
1830c This subroutine reads through the input file
1840c until the starting time is reached , the current
1850c record is then passed to the main program in a
1860c packed array called idata. On further calls the
1870c subroutine passes the next record to the main
1880c program intil the finishing time is reached
1890c whereby the subroutine returns to the designated
1900c label [ call input(irec,stime,ftime,$label) ]
1910c
1920      common/aa/idata(1230)
1930      integer time,stime,ftime
1940 10   irec= irec + 1
1950      read(8'irec,end=20)idata
1960      iyear=  fld( 1,8,idata(601))
1970      imonth= fld(10,8,idata(601))
1980      iday:   fld(19,8,idata(601))
1990      ihour=  fld(28,8,idata(601))
2000      imin=   fld( 1,8,idata(602))
```